(12) United States Patent
Tivey et al.

(10) Patent No.: US 8,713,971 B2
(45) Date of Patent: May 6, 2014

(54) INDUCTION HEATING

(75) Inventors: Neil Anthony Tivey, Chesire (GB); Kevin Maybury, Wigan (GB)

(73) Assignee: Energy Solutions, LLC, Salt Lake City, UT (US)

( * ) Notice: Subject to any disclaimer, the term of this patent is extended or adjusted under 35 U.S.C. 154(b) by 881 days.

(21) Appl. No.: 10/575,375

(22) PCT Filed: Oct. 22, 2004

(86) PCT No.: PCT/GB2004/004493
§ 371 (c)(1),
(2), (4) Date: Aug. 31, 2007

(87) PCT Pub. No.: WO2005/043959
PCT Pub. Date: May 12, 2005

(65) Prior Publication Data
US 2008/0104998 A1 May 8, 2008

(30) Foreign Application Priority Data

Oct. 24, 2003 (GB) .................................. 0324831.7

(51) Int. Cl.
*C03B 5/02* (2006.01)
*H05B 6/04* (2006.01)

(52) U.S. Cl.
USPC ................ 65/135.6; 65/128; 65/129; 65/335; 65/347; 219/662; 219/671

(58) Field of Classification Search
USPC ................ 65/135.6, 335, 347, 128, 129, 126; 219/671, 662
See application file for complete search history.

(56) References Cited

U.S. PATENT DOCUMENTS

| | | | | | |
|---|---|---|---|---|---|
| 3,057,985 | A | * | 10/1962 | Biringer | 219/662 |
| 3,244,495 | A | * | 4/1966 | Apple et al. | 65/161 |
| 4,092,510 | A | | 5/1978 | Kiuchi et al. | |
| 4,093,839 | A | * | 6/1978 | Moliterno et al. | 219/643 |
| 4,420,667 | A | * | 12/1983 | Lewis | 219/639 |
| 4,506,131 | A | * | 3/1985 | Boehm et al. | 219/662 |
| 4,542,273 | A | * | 9/1985 | Hirata | 219/662 |
| 4,755,648 | A | * | 7/1988 | Sawa | 219/661 |
| 5,034,586 | A | | 7/1991 | Havas et al. | |

(Continued)

FOREIGN PATENT DOCUMENTS

| | | |
|---|---|---|
| GB | 307044 | 12/1929 |
| GB | 2075284 A | 11/1981 |
| WO | WO 2004004420 A1 * | 1/2004 |

OTHER PUBLICATIONS

International Search Report for PCT/GB2004/004493 dated Dec. 23, 2004.

(Continued)

*Primary Examiner* — Jason L Lazorcik
(74) *Attorney, Agent, or Firm* — Myers Bigel Sibley & Sajovec, PA

(57) ABSTRACT

A current conducting melting vessel within which glass can be melted is provided. At least two induction heating coils are provided at selected locations proximate to the melting vessel. Power is selectively supplied to the coils to thereby selectively energize the coils so that the mutual induction of current in a non-energized heating coil adjacent to an energized heating coil is prevented via a switching element in power supply circuitry associated with the non-energized coil.

19 Claims, 3 Drawing Sheets

(56) References Cited

U.S. PATENT DOCUMENTS

| | | | |
|---|---|---|---|
| 5,165,049 A * | 11/1992 | Rotman | 323/212 |
| 5,272,719 A * | 12/1993 | Cartlidge et al. | 219/662 |
| 5,349,167 A * | 9/1994 | Simcock | 219/662 |
| 5,490,869 A * | 2/1996 | D'Obrenan et al. | 75/10.14 |
| 5,714,739 A * | 2/1998 | Irrera et al. | 219/626 |
| 6,121,592 A * | 9/2000 | Fishman et al. | 219/661 |
| 6,316,754 B1 * | 11/2001 | Schatz et al. | 219/656 |
| 6,576,807 B1 | 6/2003 | Brunelot et al. | 588/201 |
| 6,963,056 B1 * | 11/2005 | Peysakhovich et al. | 219/645 |
| 7,087,870 B1 * | 8/2006 | Fishman | 219/661 |
| 7,197,061 B1 * | 3/2007 | Fishman et al. | 373/142 |
| 7,202,451 B2 * | 4/2007 | Uchida et al. | 219/662 |
| 7,230,216 B2 * | 6/2007 | Uchida et al. | 219/662 |
| 7,432,481 B2 * | 10/2008 | Uchida et al. | 219/662 |
| 7,457,344 B2 * | 11/2008 | Fishman et al. | 373/150 |
| 7,466,740 B2 * | 12/2008 | Lazor | 373/144 |
| 7,582,851 B2 * | 9/2009 | Fishman et al. | 219/660 |
| 2002/0148829 A1 * | 10/2002 | Fishman | 219/656 |
| 2006/0118549 A1 * | 6/2006 | Fishman et al. | 219/656 |
| 2008/0063025 A1 * | 3/2008 | Fishman et al. | 373/144 |

OTHER PUBLICATIONS

Written Opinion of the International Searching Authority for PCT/GB2004/004493.

International Preliminary Report on Patentability for PCT/GB2004/004493 mailed Feb. 9, 2006.

Search Report under Section 17 for Application No. GB0324831.7 dated Mar. 26, 2004.

* cited by examiner

INDUCTION HEATING

RELATED APPLICATIONS

The present application is a 35 U.S.C. §371 national phase application of PCT International Application No. PCT/GB2004/004493, having an international filing date of Oct. 22, 2004, and claiming priority to Great Britain Patent Application No. 0324831.7, filed Oct. 24, 2003, the disclosures of which are incorporated herein by reference in their entireties. The above PCT International Application was published in the English language and has International Publication No. WO 2005/043959 A1.

BACKGROUND

1. Field of the Invention

The present invention relates to induction melting. In particular, but not exclusively, the present invention relates to a method and apparatus for melting a target material such as glass in a melting vessel using two or more induction heating coils. The mutual induction of current in a non-energised heating coil adjacent to an energised heating coil is prevented so that the temperature in regions within the melting vessel can be carefully controlled.

2. Related Art

There are many techniques which are known for melting materials and particularly for melting glass like materials. One of these techniques is induction heating in which electrical current is induced to flow in a current conducting melting vessel. These induced currents dissipate energy due to the Joule effect and this heating effect can be used to supply heat to material located within the melting vessel. If enough heat is supplied the material within the melting vessel melts.

A number of uses for such induction heating processes are known. One particular use is in the nuclear industry in which vitrification has long provided a safe long-term conditioning technology for radioactive waste material. In such a situation waste material which may be of low, medium or high-level radioactive waste is mixed together with a glass forming material such as glass frit in the melting vessel. The encapsulation of radioactive waste material within a glassy matrix is chosen because it is a mineral capable of including in its disordered structure many of the elements found in fission-product solutions and other waste material. Once the waste material and glass forming material have melted and been mixed together they may be poured from the melting vessel into a storage canister. The storage canister can be used to define the final solid shape of the glass mixture once it solidifies and can also aid in a subsequent glass conveying process.

An example of this vitrification process is the continuous two-step vitrification process as exemplified by the Marcoule Vitrification Unit (AVM). In this vitrification process two steps are carried out. The first is evaporation-calcination of fission-product solutions. The second step is the vitrification of the resulting calcine. The initial evaporation-calcination step may be carried out with a rotating tube heated to a predetermined temperature. The elements from the input waste material in nitrate or oxide form flow into a second stage induction-heated metal pot. Glass frit or another glass former is added (for example borosilicate glass consisting mainly of $SiO_2$ (silica), $B_2O_3$ (boric anhydride), $Al_2O_3$ (alumina) and $Na_2O$ (sodium oxide) may be used. It is know that fission-product waste material may be incorporated to this glass forming material in quantities ranging from around 10 to 20%. In known vitrification facilities the metal pot is heated to between 1000° C. and 1200° C. using a 200 kW power generator operating at a frequency of 4 kHz. As noted above the glass inside the metal pot is melted by thermal conduction upon contact with the metal wall.

However there are a number of problems which are known with such induction heating systems. One problem is that the induction heating coils which are used to heat the melting vessel are run from high frequency generators which are becoming obsolete. This makes the replacement and/or servicing costs high.

Another problem is that arcing between contactors used to supply power to the heating coils has been observed. The arcing causes failure of the contactors which must be replaced. This is expensive and time consuming.

A further problem is that operating the induction heating elements at a high frequency of around 4 kHz limits control of the temperatures attained in various regions within the melting vessel. This is because penetration depth of a high frequency electromagnetic field limits the depth to which eddy currents are induced and hence limits both the amount of heat generated within the vessel wall and inherently the thickness of vessel that can be used efficiently which in turn limits the life of the vessel due to thermal stresses.

SUMMARY OF EMBODIMENTS OF THE INVENTION

It is an aim of embodiments of the present invention to at least partly mitigate the above-mentioned problems.

According to a first aspect of the present invention there is provided a method for melting glass comprising the steps of:
  providing a current conducting melting vessel within which glass can be melted;
  providing at least two induction heating coils at selected locations proximate to said melting vessel; and
  selectively supplying power to said coils to thereby selectively energise said coils; whereby
  the mutual induction of current in a non-energised heating coil adjacent to an energised heating coil is prevented via a switching element in power supply circuitry associated with said non-energised coil.

According to a second aspect of the present invention there is provided an apparatus for melting glass is induction melting comprising:
  a current conducting melting vessel;
  at least two induction heating coils provided at selected locations proximate to said melting vessel;
  a plurality of power supply circuits each being associated with a respective one of said heating coils and being arranged for selectively supplying power to a respective coil to thereby energise that respective coil; wherein
  each power supply circuit includes a switching element for preventing the mutual induction of current in a non-energised heating coil when an adjacent heating coil is energised.

According to a third aspect of the present invention there is provided a method for reprocessing waste material comprising the steps of:
  locating said waste material together with glass forming material in a current conducting melting vessel;
  applying power to at least one of a plurality of induction heating coils located proximate to said vessel to thereby heat said glass forming material; and
  subsequently pouring a molten mixture of glass and waste material from said vessel into a storage container; wherein
  during said power applying step, at least one of said heating coils is energised and mutual induction of current in a non-energised heating coil adjacent said energised coil is prevented via a switching element in power supply circuitry associated with said non-energised coil.

According to a fourth aspect of the present invention there is provided a method for melting a target material comprising the steps of:

providing a current conducting melting vessel within which said target material can be melted;

providing at least two induction heating coils at selected locations proximate to said melting vessel; and selectively supplying power to said coils to thereby selectively energise said coils; whereby the mutual induction of current in a non-energised heating coil adjacent to an energised heating coil is prevented via a switching element in power supply circuitry associated with said non-energised coil.

Embodiments of the present invention provide a method and apparatus for melting a glass and waste material mixture using two or more induction heating coils. When only one of the induction heating coils is energised the mutual induction of current in an adjacent non-energised coil is prevented. Alternatively when adjacent coils are energised together power delivered to regions within the melting vessel associated with each of those coils is balanced. As a result embodiments of the present invention provide an induction melting process which can provide a much tighter temperature control by way of minimising the temperature differential attained through-out the vessel and contents, and prolonging vessel life where thicker walled vessels are implemented.

Embodiments of the present invention can operate at low frequency, for example 50 Hz. The lower frequency electromagnetic field has deeper penetration and so can be used with a thicker walled vessel retaining its heat efficiency and thus providing extended vessel life.

BRIEF DESCRIPTIONS OF THE DRAWINGS

Embodiments of the present invention will now be described hereinbelow, by way of example only, with reference to the accompanying drawings in which.

DESCRIPTION OF EMBODIMENTS ACCORDING TO THE INVENTION

Figure 1:
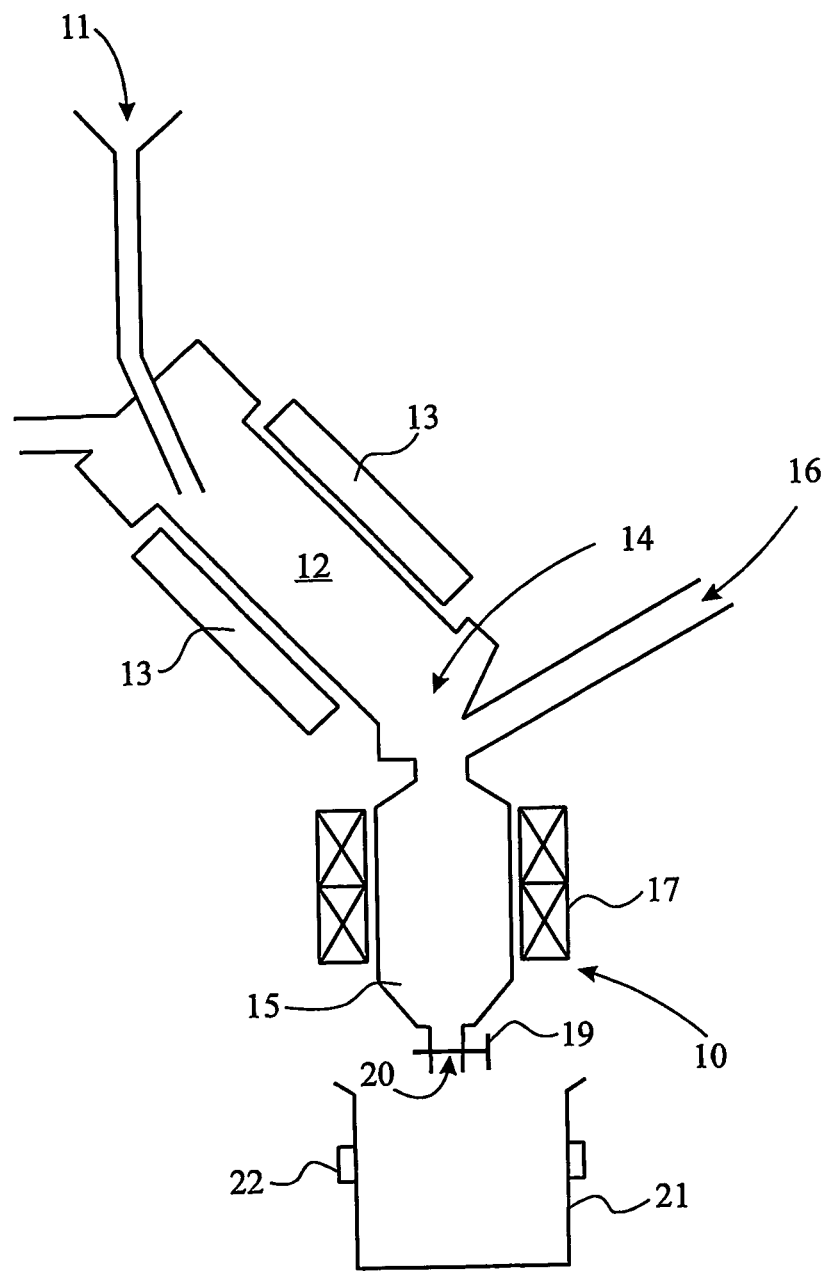
FIG. 1 illustrates a vitrification process.

In the drawings like reference numerals refer to like parts.

In accordance with an embodiment of the present invention FIG. 1 illustrates a continuous two-step vitrification process which uses in one of the steps an induction furnace to melt a mixture of glass and waste material. It will be understood that embodiments of the present invention may be used in this procedure however the invention is not limited to use in such an environment but rather is broadly applicable to induction melting in general.

In the vitrification process illustrated in FIG. 1 waste material in a solution form which may for example be a fission-product from the nuclear industry is introduced into an inlet 11. This solution falls into a rotating kiln 12 which is effectively a rotating tube heated by a resistance furnace 13. The furnace produces a first evaporation-calcination step and the solid calcine, which includes elements from the waste solution input at inlet 11 in nitrate or oxide form, falls through chamber 14 into the induction heating vessel 15. A glass former such as glass frit is added to the solid waste material entering the induction furnace through inlet 16. When melted this glass former provides containment glass within the matrix of which the elements of the waste material will be locked. A borosilicate glass is one particularly advantageous glass former. The metal pot 15 may be heated to temperatures between 1000° C. and 1200° C. using a induction heating method in which coils 17 may be selectively energised. When energised the coils act as a primary in a transformer element with the secondary element of the transformer being formed by the metal body of the melting vessel 15. As a result of the application of power to the coils an electrical current is induced in the body of the melting vessel. These induced currents cause a heating effect in the melting vessel and this heating effect is conducted to the contents of the melting vessel causing the glass and waste material to mix and melt. At an appropriate moment when a predetermined quantity of melted mixture is located in the melting vessel a tap 19 or other discharge means for opening an outlet 20 is opened to discharge molten material into a canister 21. The canister 21 is used to determine the final shape of the solid glass block which forms as the molten mixture solidifies. The canister may also include handles 22 or other means which aids the subsequent movement of the canister.

Figure 2:
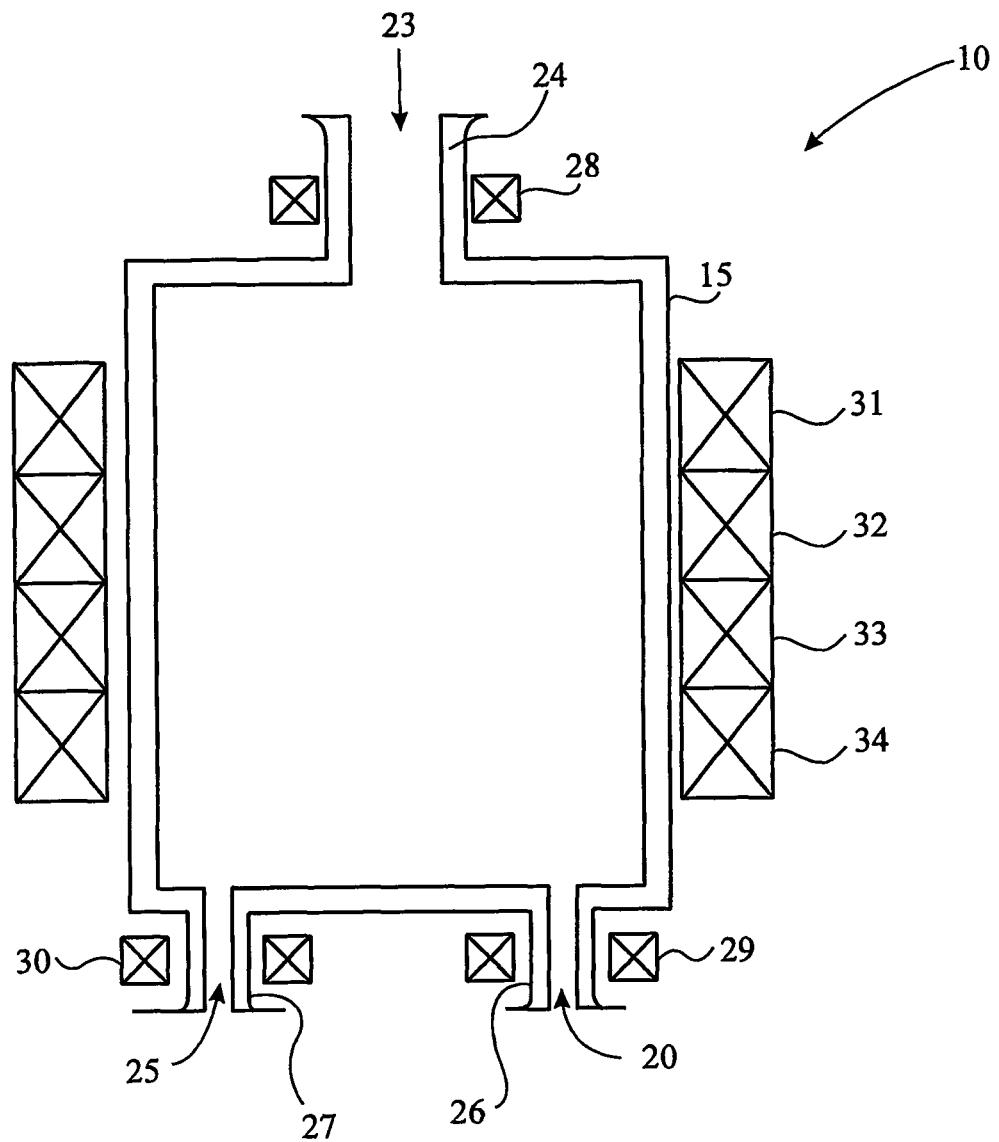
FIG. 2 illustrates an induction melting vessel.

FIG. 2 illustrates an induction furnace in more detail. The induction furnace 10 includes an electrical current conducting melting vessel 15 which may for example be manufactured from a metal nickel-based alloy. The melting vessel has an inlet 23 formed by a neck region 24 of the melting vessel body 15. Waste material and glass forming material are input at the inlet 23. The melting vessel has a least one outlet 20 from which a mixture of the molten glass and waste material may be poured into a canister located below the melting vessel. A further aperture 25 may also be provided which can be used to drain the melting vessel during a refitment procedure. Both of the apertures 20 and 25 are formed by respective neck regions 26, 27 formed from the body region of the melting vessel. Each of the apertures 23, 20, 25 are associated with a respective induction melting heating coil 28, 29 and 30 respectively. By selectively energising these coils glass blockages forming seals on the apertures may be melted. In this way the apertures are opened as though a tap has been turned. It will be understood that embodiments of the present invention are not restricted to a mixing vessel having this particular shape and/or number of inlets and/or outlets. Likewise it will be understood that other forms of tap mechanism may be provided without the use of the induction heating coils 28, 29 and 30. It will likewise be understood that each of the tap coils requires a respective power supply circuit for selectively energising the coil when the seal on that respective aperture needs to be removed.

Four heating coils 31 to 34 form the coils 17 shown in FIG. 1 and are located proximate to the melting vessel. It will be understood that embodiments of the present invention are not limited to use of four coils. The coils are located close enough to the metal melting vessel so that when energised a current is induced in the melting vessel in a region associated with the respective energised coils. As a result of the induced current flowing in the metal container the metal container itself heats up. This heat is transferred into the contents of the mixing vessel 15 and will after a predetermined amount of time act to melt the glass frit input at inlet 23. As the glass melts the atoms and molecules of the waste material become located in the glassy matrix. In this way because of its amorphous structure the glass accommodates the wide variety of elements found in spent fuel. The fission-product parts form bonds within the main components of the glassy vitreous matrix and these bonds act to lock the waste material within the glassy matrix.

Each of the heating coils 31 to 34 may be turned on and off by respective power supply circuitry so that one, two, three or four heating coils may be energised at any one time and in any combination. As a result of this fact the temperature gradients and temperature profiles of zones (or regions) within the melting vessel may be selectively controlled. It will be understood that more or less than four heating coils may be provided so as to provide control of the temperature in any area of the melting vessel.

Figure 3:
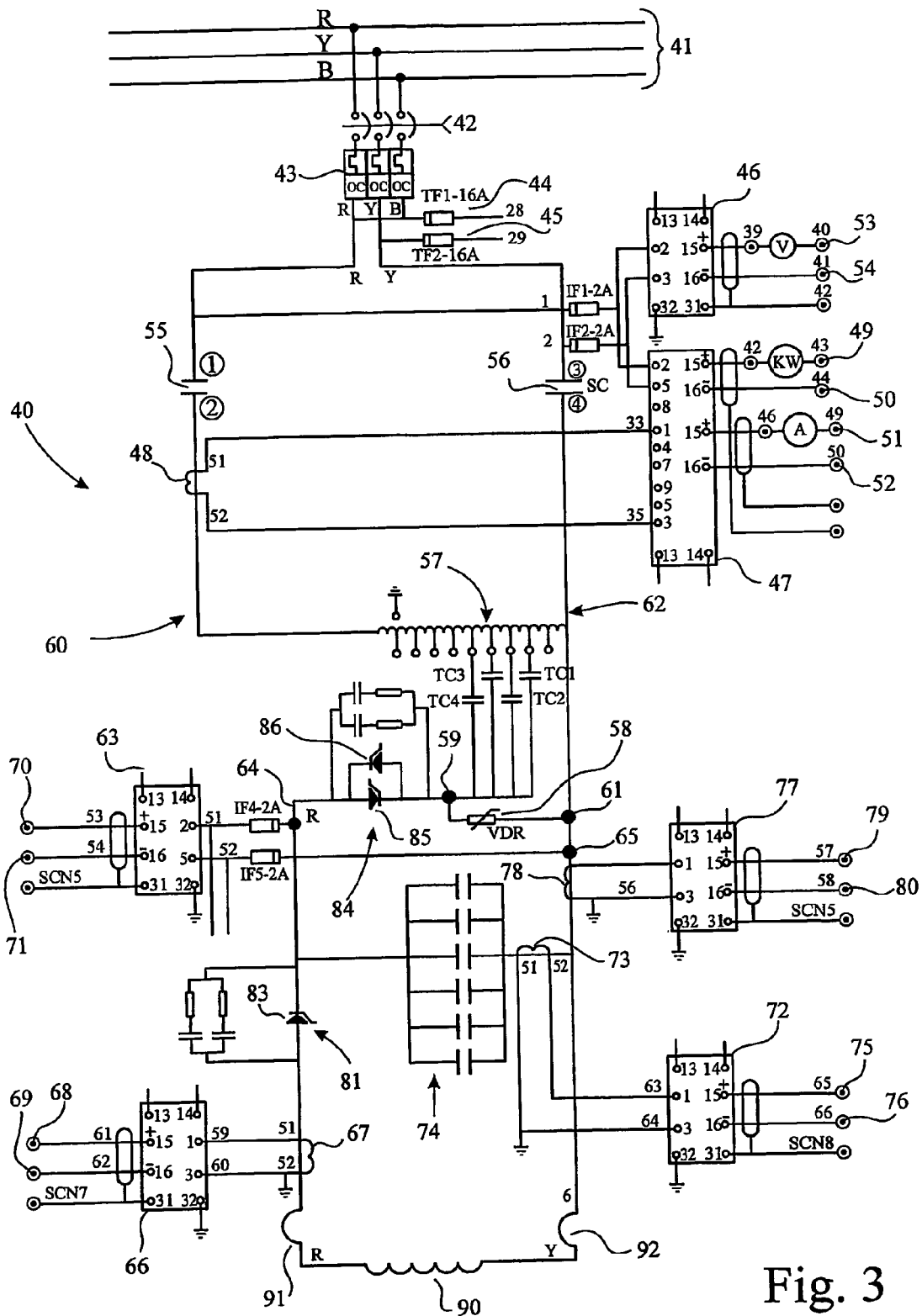
FIG. 3 illustrates power supply circuitry for supplying power to an induction heating coil.

FIG. 3 illustrates power control circuitry 40 which can be used to supply power to one of the induction heating coils. Each coil is provided with its own separate supply. When power is supplied to the coil the coil is energised and will then act as a primary coil of a transformer element. A region of the current conducting melting vessel 15 close to the coil will act as a secondary in which a current is induced to flow. By turning the supply of power to a coil on and off the current induced in the melting vessel can be controlled and the associated heating effect thus also controlled. Coils adjacent to an energised coil may also be supplied with power to thereby energise the coils or may be non-energised. By selecting when coils are or are not energised by controlling the supply of power in the power supply circuit 40 associated with each separate coil the heating effect within the melting vessel can be controlled.

In FIG. 3 the power supply circuitry is provided with a three phase 50 Hertz AC power supply 41. It will be understood that any other low frequency supply could be used. Around 50 Hz is particularly convenient because it represents a mains power supply in the UK. Two phases such as the supplies nominated as red and yellow are input into a circuit breaker 43 to provide protection to the circuitry during power surges/faults. In this way the phase selection is obtained by hard wiring the required phases at the outgoing side of the MCCB (circuit breaker) (43). Elements (42) are flexible couplings between the MCCB and the bus-bars from where the power is derived. These are not necessarily required. Fuses 44 and 45 are also provided to supply power to the circuitry via a step down transformer not shown for clarity.

A transducer 46 monitors incoming voltage characteristics and may be used to provide details of these indicating a supply voltage to a user. A supply power transducer 47 receives as an input a current induced in a current transformer element 48 which monitors current in the red leg of the supply line. In this way the supply power may be identified across monitoring points 49 and 50. The current may be checked via monitoring points 51 and 52 and the voltage via monitoring points 53 and 54. Two safety contactors 55 and 56 each in a respective leg of the supply operate to break a circuit if an interlock occurs. An interlock is an external plant condition, or a safety trip, providing a means of shutting down vessel heating if required.

A tapped transformer element 57 acts as a course power level set to determine a range of power which may be supplied to the heating coil associated with the particular power supply circuitry. Four contactors are illustrated providing four possible settings for the power. It will be understood that embodiments of the present invention are not limited to the use of four settings.

A metal varister 58 is connected in parallel across a supply node 59 in supply leg 60 and a return node 61 in return leg 62 for transient suppression to reduce transient spikes. An output voltage transducer 63 is connected to a node 64 in the supply leg 60 and a node 65 in the return leg 62 for monitoring the output voltage supplied to the inductor coil, via monitoring points (70) and (71).

Total current transducer element 66 has an associated inductive element 67 in the supply leg 60. The current induced in the inductive element 67 by the current flowing through the heating coil in the supply leg will give an indication of the total current which may be monitored at monitoring points 68 and 69.

A capacitor current transducer 72 and associated inductive element 73 provide an indication of the current flowing through a capacitor bank 74 during a precharging and/or coil power supply operation as described hereinbelow. This current may be monitored across monitoring points 75 and 76. A further transducer 77 and associated inductive element 78 provide an indication of the current flowing through the return leg 62 of the supply circuitry 40. Monitoring points 79 and 80 are provided to supply this indication to a user monitoring the operation of the power supply circuitry. It will be understood that the monitoring can be an automatic process.

A first switching element 81 consists of a thyristor 83. The thyristor 83 acts as switch so that a current mutually induced within a non-energised heating coil by the effects of an adjacent energised heating coil are prevented.

Serially connected resistors and capacitors are connected in parallel and then the whole connected in parallel across the input and output of the thyristor 83 to act as a snubber so as to provide suppression of the load to reduce transient spikes.

A second switching element 84 formed by oppositely orientated thyristors 85 and 86 are connected in the supply leg 60 of the power supply. A snubber circuit formed by a serially connected capacitor and resistor connected in parallel with another serially connected capacitor and resistor are connected across the inputs and outputs of the two thryistors 85 and 86 in the second switching element 84. This is also to provide a snubber circuit to reduce transient spikes in the power supply.

It will be understood that each of the thyristors 83, 85 and 86 have a control contact which may be selectively switched hard on and hard off to permit current to flow through the thyristor.

The second switching element 84 operates to precharge the capacitors in the capacitor bank 74 during a precharge operation. During the precharge operation which occurs immediately prior to the energising of a heating coil, thyristors 85 and (86) are switched on whilst thyristor 83 is maintained off. It will be understood that rather than using a dual thyristor arrangement a single larger thyristor could be used. The timing of the turning on and off of the thyristors is controlled so that approximately two seconds later the control gate of thyristor (83) is switched so that power is supplied to the induction heating coil. The precharging of the capacitor bank is to reduce the initial surge on the power supply 41 when a heating coil is initially to be energised. It will be understood that embodiments of the present invention may be utilised without switching element 84 and capacitor bank 74 when the restraint of power surges on a power supply are not of importance.

The inductor 90 may be one of the heating coils 31 to 34 indicated in FIG. 2 and may be connected to the power supply circuitry 40 via Tombac connectors 91 and 92 or other suitable connections.

By controlling the turning on and turning off of switching elements 81 and 84 power may be supplied to the heating coil 90 associated with the respective power supply circuit 40. The energising of the coil 90 induces a current to flow in the metal heating vessel adjacent to the coil. This has a heating effect.

When two adjacent heating coils such as coils 31 and 32 in FIG. 2 are energised simultaneously the control gate of thyristor 83 is supplied with a control signal to switch the thyristor on. In this way the current induced to flow in the melting vessel 15 by both coils 31 and 32 will, as well as having a heating effect, cause an interaction between electromagnetic fields such that the weaker field is enhanced by the adjacent stronger fields and thus balance power demand across the energised zones. This occurs if the same two phases are selected at (43) and the supply and return legs are the same orientation on each of the zones (i.e. the direction of the electromagnetic fields are the same) and as a result multiple heating coils may be energised at one time.

Temperature sensors (not shown) such as thermocouples may be located within and around the melting vessel to sense the temperatures at particular regions of the vessel. These readings may be used to control the energising of particular coils around the melting vessel so as to maintain the temperatures within predetermine threshold limits.

Embodiments of the present invention provide a way of heating zones of the main vessel body. The heating zones are subject to a mutual inductive effect which induces fields into the adjacent zones due to the mutual coupling of the induction media, the vessel, itself. This mutual coupling is removed from adjacent zones that are not firing concurrently by the isolation provided by the thyristor module 81. However when adjacent heating coils and thus adjacent zones are firing simultaneously the mutual coupling is permitted which balances the total power delivered equally across the energised zones. 50 Hertz induction heating coils 31 to 34 may be utilised in which the power is derived from mains frequency stepped down through a multi-tap auto-transformer to provide a coarse power level setting via contactors. This adjustment sets the amount of power delivered to the induction coil when the circuit is energised. Fine control of heat applied to respective zones is gained by control of turning thyristors in a switching element 81 on or off in a time proportional manner derived from control circuits using feedback from the vessel thermocouples.

Embodiments of the present invention provide a heating system which can use 50 Hertz power supplies. Such power supplies are readily available and produce a wider magnetic field having more penetration. This enables melting vessels to have a thick wall which increases the lifetime of the metal vessel and reduces thermal stress.

Embodiments of the present invention have been described hereinabove by way of example only. It will be understood that modifications to the specifically described examples may be made without departing from the scope of the present invention.

The invention claimed is:

1. A method for melting glass comprising:
providing a current conducting melting vessel within which glass can be melted;
the melting vessel includes an inlet formed by a neck region and at least one outlet arranged respectively for receiving glass frit and draining the contents of the vessel to a location below the vessel during a draining operation
providing at least two induction heating coils at selected locations proximate to the melting vessel and a plurality of power supply circuits each being associated with a respective one of the heating coils and being arranged for selectively supplying power to the respective coil to thereby energise that respective coil;
locating glass forming material within the vessel
selectively supplying power to the heating coils to thereby selectively energise the coils and melt the glass forming material; and
preventing or permitting a mutual induction of current in at least one of the heating coil adjacent to an energised heating coil by selecting an on or off status of a switching element in a respective one of the power supply circuits associated with the adjacent heating coil, wherein the switching element is switchable between the off status in which mutual inductance of current is prevented in the adjacent heating coil and the on status in which mutual inductance of current is permitted in the adjacent heating coil, and wherein the power supply circuitry associated with each heating coil includes:
a first portion comprising; a supply leg and a return leg connected to a power supply; and a transformer element connected between the supply leg and the return leg; and
a second portion connected to a supply node in the supply leg and a return node in the return leg, the second portion comprising the heating coil and the switching element.

2. The method as claimed in claim 1 further comprising:
when two or more adjacent coils are simultaneously energised during a heating operation, balancing the heating power delivered to respective zones associated with each adjacent coil, in the vessel.

3. The method as claimed in claim 2 further comprising:
during the heating operation in which two or more adjacent coils are simultaneously energised, allowing the mutual induction of current in the adjacent coils to occur.

4. The method as claimed in claim 1 further comprising:
selecting which of the at least two induction coils is energised by selectively switching a switching element, located in power supply circuitry associated with a respective coil, on or off.

5. The method as claimed in claim 1 further comprising:
prior to a step of energising a selected coil, precharging a capacitor bank and subsequently utilising power stored in the capacitor bank during the precharging step, during an early stage of energising the selected coil.

6. The method as claimed in claim 1 further comprising the step of providing a 50 Hertz AC power supply for supplying power to the at least two coils.

7. The method as claimed in claim 1 wherein the switching elements comprise at least one thyristor.

8. An apparatus for melting glass via induction melting comprising:
a current conducting melting vessel;
the melting vessel includes an inlet formed by a neck region and at least one outlet arranged respectively for receiving glass frit and draining the molten contents of the melting vessel to a location below the vessel during a draining operation
at least two induction heating coils provided at selected locations proximate to the melting vessel;
a plurality of power supply circuits each being associated with a respective one of the heating coils and being arranged for selectively supplying power to a respective coil to thereby energise that respective coil; wherein each power supply circuit includes:
a first portion comprising a supply leg and a return leg connected to a power supply and a transformer element connected between the supply leg and the return leg; and
a second portion connected to a supply node in the supply leg and a return node in the return leg, the second portion comprising the respective coil; and
a switching element arranged to selectively prevent and permit a mutual induction of current in a respective heating coil when an adjacent heating coil is energised according to a selected on or off status of the switching element, and wherein the switching element is switchable between an off status in which mutual inductance of current is prevented in the respective heating coil and an on status in which mutual inductance of current is permitted.

9. The apparatus as claimed in claim 8 wherein:
each heating coil is arranged to provide a heating effect in a respective region of the melting vessel when the coil is energised.

10. The apparatus as claimed in claim 8 wherein the switching element comprises at least one thyristor.

11. The apparatus as claimed in claim 8 wherein:
the melting vessel includes an inlet and a drain outlet and pour outlet arranged respectively for receiving glass frit and waste material, draining the contents of the vessel during a draining operation and pouring a molten mixture of the glass and waste material during a pour operation.

12. The apparatus as claimed in claim 11 further comprising:
a plurality of induction heating elements each arranged proximate to a respective one of the inputs and drain and pour outputs and arranged to selectively melt a glass seal closing the input or output to thereby permit the addition of new glass and/or waste material and the outflow of molten material, respectively.

13. The apparatus as claimed in claim 8 wherein:
each power control circuit includes a further switching element arranged to selectively charge a bank of capacitors in the power control circuit during a precharge operation.

14. The apparatus as claimed in claim 8 further comprising:
a 50 Hertz AC power supply for supplying power to the heating coils.

15. The apparatus as claimed in claim 8, wherein the at least two induction heating coils comprise a first induction heating coil and a second induction heating coil, and when the switching element is in the off status, the switching element is configured to open a circuit including the second induction heating coil to stop current flow in the circuit including the second induction heating coil and prevent the mutual induction of current by the second induction heating coil when the first induction heating coil is energised, and when the switching element is in the on status, the switching element is configured to close the circuit including the second induction heating coil to permit the mutual induction of current in the second induction heating coil when the first induction heating coil is energised.

16. The apparatus as claimed in claim 8, wherein each induction heating coil of the at least two induction heating coils comprises first and second opposite ends, the apparatus further comprising an induction coil circuit that includes a respective power supply circuit and electrically connects the first and second ends of the induction heating coil, wherein the switching element is positioned in the induction coil circuit, and the switching element is configured to open the induction coil circuit and stop current flow in the induction coil circuit when the switching element is in the off status to prevent the mutual induction of current and to close the induction coil circuit when the switching element is in the on status to permit the mutual induction of current.

17. The apparatus as claimed in claim 8, wherein the transformer element is a tapped transformer element comprising a plurality of contactors arranged to provide a plurality of possible settings for the power supplied to the respective heating coil.

18. A method for reprocessing waste material comprising:
locating the waste material together with glass forming material in a current conducting melting vessel;
the melting vessel includes an inlet formed by a neck region and at least one outlet arranged respectively for receiving glass frit and draining the contents of the vessel to a location below the vessel during a draining operation;
the melting vessel further comprising at least two induction heating coils at selected locations proximate to the melting vessel and a plurality of power supply circuits each being associated with a respective one of the heating coils and being arranged for selectively supplying power to the respective coil to thereby energise that respective coil;
applying power to at least one of the induction heating coils located proximate to the vessel to thereby heat the glass forming material; and
subsequently pouring a molten mixture of glass and waste material from the vessel into a storage container; wherein
during the power applying step, at least one of the heating coils is energised and mutual induction of current in a heating coil adjacent the energised coil is prevented or permitted by selecting an on or off status of a switching element in a respective one of the power supply associated with the adjacent heating coil, wherein the switching element is switchable between an off status in which mutual inductance of current is prevented in the adjacent heating coil and an on status in which mutual inductance of current is permitted in the adjacent heating coil, and wherein the power supply circuitry associated with each heating coil includes:
a first portion comprising; a supply leg and a return leg connected to a power supply; and a transformer element connected between the supply leg and the return leg; and
a second portion connected to a supply node in the supply leg and a return node in the return leg, the second portion comprising the heating coil and the switching element.

19. The method as claimed in claim 18 further comprising:
when two or more adjacent coils are simultaneously energised during the power applying step, balancing the heating power delivered to respective zones associated with each adjacent coil in the vessel.

* * * * *